Patented Sept. 28, 1954

2,690,396

UNITED STATES PATENT OFFICE 2,690,396

STABILIZATION OF EDIBLE MATERIALS

Joseph A. Chenicek, Bensenville, Ill., assignor to Universal Oil Products Company, Chicago, Ill., a corporation of Delaware No Drawing. Application December 30, 1948, Serial No. 68,428

20 Claims. (Cl. 99—8)

1

This is a continuation-in-part of copending application Serial No. 692,149, filed August 21, 1946, and now abandoned.

This invention relates to the stabilization of edible materials and more particularly to a novel method of preserving the desirable qualities thereof.

Edible materials tend to become rancid due to oxidize deterioration. Uusally, it is the oils and fats contained in the edible materials which undergo undesirable oxidative deterioration but in some cases the solid portions of the edible materials in close association with the oils and fats also suffer deterioration. Therefore, in accordance with the present invention, the novel inhibitor composition may be applied either to the solid materials or to the oils which have been separated therefrom.

A particular example of applying the novel inhibitor composition of the present invention to a solid material is the treatment of crops in order to preserve the desirable qualities thereof before and after cutting. It has been found that the drying of crops either in the field or in drying equipment results in a loss of valuable food accessory factors. For example, alfalfa loses anywhere from 45% to 85% of its carotene value during the drying treatment. Similarly, carotene is found in sweet potatoes and in other yellow pigmented plants. Vitamin $B_1$ (thiamine hydrochloride) is found in various seeds, grains, nuts, legumes, fruits and vegetables, while $B_2$ (riboflavin) is found in wheat germ and leafy vegetables. Nicotinic acid (niacin) is found in wheat germ and in several green leafy vegetables, while vitamin $B_6$ (pyridoxine) is found in whole grain cereals, crude cane mollasses, etc. Vitamin C (ascorbic acid) is found in citrus fruits, tomotoes, green peppers, and various other fresh fruits and vegetables, and vitamin E is found in wheat germ oil, cotton seed oil, green leafy vegetables and various grains. Vitamin $K_1$ is found in alfalfa, spinach, and other green vegetables. Pantothenic acid is found in crude cane molasses and wheat germ. Several postulated vitamins which have not as yet been completely accepted, such as citrin, gizzard erosion factor, etc., are found in various crops, the citrin being present in citrus foods, and the gizzard erosion factor being present in alfafa, kale, etc. It is understood that the above is merely a brief reference to the vitamin content of various crops and that these and other crops may also contain other vitamins as, for example, spinach contains vitamins A, $B_2$, later known as vitamin G (riboflavin) and C,

2 beets contain vitamin $B_1$, potatoes contain vitamin $B_2$, parsley, cabbage and berries contain vitamin C, etc.

In addition to vitamins or in absence of vitamins, various crops contain other desirable substances which tend to deteriorate due to oxidative deterioration. For example, various fatty acids, such as caprylic, capric, lauric, myristic, palmitic, stearic, oleic, linoleic, etc., are found in the oils of coconut, babassu, palm kernel, olive, castor, peanut, rapeseed, cotton seed, corn soya bean, etc. Alcohols are found in cockfoot grass, wheat, lucerne leaf, etc. Various sterols are found in plant oils, ergosterol, for example, being found in soya bean oil. Further, crops may become rancid and lose desirable qualities such as tast, odor, retention of physical shape (nonwilting), etc., due to oxidative deterioration.

The present invention offers a novel method of preventing or retarding the oxidative deterioration of these substances while standing in the field, during storage, and during manufacture.

The term "crops" as used in the present invention is intended to include any substance grown from the soil to be used as a food for humans or animals, either in the form as gathered from the field or after suitable modification in form, such as by pressing, grinding, pulverizing, slurrying, making into paste, flour, etc., either used as such or after suitable cooking. Thus the present invention is applicable to the treatment of forage crops, such as alfalfa, clover, hay, fodder, etc.; grains such as corn, wheat, oats, rice, barley, rye, soy beans, etc.; vegetables such as carrots, peas, spinach, beets, potatoes, parsely, cabbage, etc.; fruits including both small fruits, and those grown on trees, such as berries, oranges, lemons, grapefruit, apples, bananas, melons, dates, figs, etc.; nut crops including peanuts, walnuts, pecans, almonds, chestnuts, hazel nuts, etc.; hops, coffee, tea, sugar crops, etc. Also included are crops such as tobacco, which although are not actually consumed as such, are chewed and the oils therefrom are allowed to enter into the system. It is understood that the above crops are merely typical representatives and that the broad scope of the present invention is not intended to be unduly limited to the crops specifically mentioned, but is to include all other crops subject to oxidative deterioration.

Other solid edible materials which may be treated in the present invention include meat, fish, dairy products such as cheese, dried milk and butter, candy, chocolate, etc., and various baked goods. These materials may be treated with the inhibitor either before or after cooking, baking, smoking or the like.

The edible oils and fats which may be stabilized in accordance with the present invention are generally of animal and vegetable origin. Merely as typical representatives, the following are mentioned; linseed oil, menhaden oil, cod liver oil, castor oil, olive oil, rapeseed oil, coconut oil, palm oil, corn oil, sesame oil, peanut oil, babassu oil, butter, fat, lard, beef tallow, etc., as well as hydrogenated oils and fats such as are sold under various trade names including "Crisco," "Spry," "Snowdrift," etc. It is understood that other oils and fats may be treated within the scope of the present invention, including oils and fats which have previously been subjected to various treatments, such as blowing with air, heat treatment, etc.

Many compounds are known which will prevent the development of rancidity in edible oils and fats but practically all of them are unsuitable because they are either toxic and therefore cannot be used for stabilizing the edible oils and fats, or else they impart bad odor and taste to such oils and fats. Some of these compounds are so volatile they are removed from the oils and fats during cooking or in deep fat drying, while others are relatively insoluble in oils and fats.

A very important feature of an inhibitor for the stabilization of oils and fats is that the inhibitor carries over into the bakery products. Many bakery products as, for example, crackers, are kept for considerable periods of time in factories, stores or in the homes, before consumption. These bakery goods tend to become rancid due to these long periods of storage. While some of the known inhibitors are very potent when used in edible oils and fats, they do not have this important property of carrying over into the bakery goods and therefore are not completely satisfactory for the purpose intended. It is an object of the present invention to provide a novel inhibitor composition which will retard deterioration of edible oils and fats and will also retard the development of rancidity in the bakery goods.

In one embodiment the present invention relates to a process for stabilizing an edible material which comprises applying thereto an inhibitor composition comprising a 2-alkyl-4-alkoxyphenol and lecithin.

In a specific embodiment the present invention relates to a method of stabilizing crops subject to oxidative deterioration which comprises applying to said crops an inhibitor composition comprising a 2-alkyl-4-alkoxyphenol and lecithin.

In another specific embodiment the present invention relates to a method of stabilizing alfalfa which comprises spraying alfalfa with an emulsion of water, a 2-alkyl-4-alkoxyphenol and lecithin.

In another specific embodiment the present invention relates to a process for stabilizing edible oils and fats against rancidity which comprises incorporating therein a small amount of an inhibitor composition comprising a 2-alkyl-4-alkoxyphenol and lecithin.

In accordance with the present invention, the edible material is stabilized with an inhibitor composition comprising a 2-alkyl-4-alkoxyphenol and lecithin. The 2-alkyl-4-alkoxyphenol is a very potent oxidation inhibitor and thus prevents oxidative deterioration of the edible materials. An important feature of this inhibitor is that it is non-toxic and, therefore, can be added without harmful results. Another important feature of this inhibitor is that it has the peculiar property of withstanding high temperatures and, therefore, its effectiveness is not destroyed during subsequent drying and cooking. Still another important feature of this inhibitor is that it has the properties of carrying over into the finished cooked products, and therefore, it will stabilize the products after cooking.

The lecithin in combination with the 2-alkyl-4-alkoxyphenol serves a dual purpose. In one case the lecithin serves both as a solvent and in another case the lecithin serves both as an emulsifying agent and as a synergist when a water dispersible inhibitor composition is desired. Thus, the mixture of 2-alkyl-4-alkoxyphenol and lecithin can be used when a water insoluble composition is desired as in the case of the incorporation of this inhibitor in edible oils. On the other hand, water may be added to this mixture to form a water dispersable composition, the lecithin serving as an emulsifying agent. In some cases, it is desired to apply the inhibitor to a water solution or suspension of edible materials, such as milk, or when it is desired to dip fish or other edible materials into a water solution of inhibitor, etc., and the inhibitor composition for use in such cases should be water dispersible.

It is thus seen that the synergist serves not only as a solvent or emulsifier but also as a synergist. Synergist is the term applied to certain compounds which, when added to oxidation inhibitors, serve to increase the effectiveness of the oxidation inhibitor far beyond that obtained by either the oxidation inhibitor or the added compound when used alone. As hereinbefore set forth, lecithin has the peculiar property of serving in this dual capacity.

The oxidation inhibitor of the present invention comprises a 2-alkyl-4-alkoxyphenol of the general structure

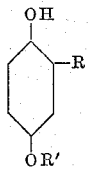

wherein R and R' are alkyl groups.

The alkyl group substituted in the ring may comprise any alkyl group such as methyl, ethyl, propyl, isopropyl, butyl, isobutyl, sec-butyl, tert-butyl, amyl, isoamyl, sec-amyl, tert-amyl, etc. Of these groups the tert-alkyl groups appear to be more effective in contributing to the inhibitor potency of the resultant compound. Likewise, the groups of higher molecular weight contribute to other desirable properties of the inhibitor.

The alkyl group of the alkoxy substituent may comprise, for example, methyl, ethyl, propyl, isopropyl, butyl, isobutyl, sec-butyl, tert-butyl, amyl, isoamyl, sec-amyl, tert-amyl, etc., and may be the same as or different from the other alkyl substituent group. In general, it may be said that the alkoxy groups of relatively low molecular weight, comprising methoxy or ethoxy groups, appear to have the strongest influence, although the other groups have considerable value. Particularly preferred oxidation inhibitors comprise 2-tert-butyl-4-methoxy phenol and 2-tert-butyl-4-ethoxy phenol.

The oxidation inhibitor of the present invention may be prepared in any suitable manner. One particularly convenient method of preparing the inhibitor consists in alkylating a hydroquinone ether and particularly a monalkyl ether with an olefin-acting substance including an olefin, alcohol, ether, etc. For example, hydroquinone monomethyl ether may be reacted at a temperature of 75° to 80° C. with a tertiary alcohol corresponding to the group to be substituted, as, for example, tertiary butyl alcohol, using 85% phosphoric acid as the catalyst. The reaction mixture is stirred continuously until the reaction is complete. The mixture is then washed with water to remove the remaining acid and is extracted with 10% sodium hydroxide solution to remove the unreacted hydroquinone ether. The insoluble portion is distilled under reduced temperature and the resulting compound may be further purified by recrystallization.

The lecithin preferably comprises commercial lecithin which normally contains cephalin. The lecithin may be obtained from any source, such as crude soya bean, corn or cotton seed oil. The lecithin may be used in its crude form or it may be used after refining in the customary manner.

Lecithin as normally available is a waxy solid which upon the addition of suitable acid, such as stearic acid, phosphoric acid, citric acid, ascorbic acid, etc., becomes a liquid. The liquid therefore serves as a liquid solvent for the 2-alkyl-4-alkoxyphenol and thereby may be readily incorporated into edible materials. Phosphoric acid, citric acid, and ascorbic acid also function as synergists so that the final inhibitor composition is of further high potency.

When the inhibitor is to be used to the treatment of crops, this is readily accomplished by spraying the inhibitor composition either as a solution or as an emulsion in water over the crops. This method has the advantage that the amount of inhibitor to be employed may be closely controlled in order to obtain even distribution thereof over the crops. It is understood that other methods of applying the inhibitors to crops may be employed, such as those in which the inhibitor composition is released from a zone of high pressure in the form of a fog or mist.

In some cases better results are obtained when the emulsion and crops are heated to a temperature of from about 200° to about 500° F. for a period of from 10 seconds to 1 hour or thereabouts. However, it is understood that, when the inhibitor is applied to crops standing in the field, it is generally impractical if not impossible to heat the mixture. However, when the inhibitor is applied to the crops after cutting, the heating may be accomplished in driers or by other suitable means. Alfalfa, for example, is usually subjected to a drying treatment and this drying treatment may also serve to effect the desired heating for improved results of the emulsion.

The inhibitor may be sprayed on the crops by hand or from airplanes or by any other suitable method in order to distribute the inhibitor evenly over the crops. The inhibitor will penetrate throughout and within the leaves, seed, etc., of the crops and will thereby serve to preserve the desirable qualities, not only of the leaves themselves, but also of the oils and the like obtained from the crops. Similarly, the inhibitor will penetrate into the larger produce such as oranges, lemons, melons, apples, pears, etc., and thereby will serve to preserve the vitamin content and other desirable properties thereof.

As hereinbefore set forth, a preferred method of applying the inhibitor composition to solid edible materials is by spraying. However, it is understood that other suitable methods may be employed such as dipping or soaking the edible materials into a solution or emulsion of the inhibitor composition. In some cases a colloid which forms a gel-like structure may be included in the inhibitor solution or emulsion in order to form a surface coating for the solid material dipped or soaked therein. In addition the cut crops, including fruits, vegetables, etc., meats and fish, either before or after cooking, baking, smoking, etc., may be treated in this manner. For example, smoked sausage or other smoked meats, fillet of fish, smoked fish, etc. which deteriorate in storage may be treated in this manner.

When the inhibitor composition is to be used in an edible oil, it may be added in any suitable manner. In general, the inhibitor composition is used in oils and fats in amounts of less than 1% by weight and generaly below 0.01%, based upon the 2-alkyl-4-alkoxyphenol. In most instances the amount thereof will be within the range of from about 0.0001% to about 0.01%. It is understood that the inhibitor composition of the present invention may also be used in conjunction with other oxidation inhibitors, synergists, metal suppressors or other additives to be incorporated in edible materials.

The proportions of lecithin and 2-alkyl-4-alkoxyphenol to be used will vary, depending upon the particular purpose intended and the lecithin to 2-alkyl-4-alkoxyphenol ratio on a volume basis may range from about 0.05:1 to 300:1 or more. The higher proportions of lecithin are used when the lecithin is to serve as a solvent, and a preferred inhibitor composition for this embodiment of the invention comprises 25% by volume of 2-alkyl-4-alkoxyphenol and 75% by volume of lecithin.

I claim as my invention:

1. A method for stabilizing edible materials which comprises incorporating therein an inhibitor composition comprising a 2-tert-alkyl-4-alkoxyphenol and lecithin.

2. A process for stabilizing crops subjected to oxidative deterioration which comprises applying to said crops an inhibitor composition comprising a 2-tert-alkyl-4-alkoxyphenol and lecithin.

3. A process for stabilizing crops subject to oxidative deterioration which comprising spraying said crops with an emulsion of water, an oxidation inhibitor comprising a 2-tert-alkyl-4-alkoxyphenol and lecithin.

4. A process for stabilizing alfalfa which comprises spraying the alfalfa with an emulsion of water, 2-tert-butyl-4-alkoxyphenol and lecithin.

5. A process for stabilizing alfalfa to prevent loss in vitamin content during drying which comprises spraying the alfalfa with an emulsion of water, 2-tert-butyl-4-methoxyphenol and lecithin.

6. A process for stabilizing crops subject to oxidative deterioration which comprises spraying said crops with an emulsion of water, lecithin, and 2-tert-butyl-4-alkoxyphenol.

7. A process for stabilizing alfalfa to prevent loss in vitamin content during drying which comprises spraying the alfalfa with an emulsion of water, lecithin, and a 2-tert-alkyl-4-alkoxyphenol.

8. A process for stabilizing edible oils and fats which comprise incorporating therein an inhibitor comprising a 2-tert-alkyl-4-alkoxyphenol and lecithin.

9. A process for stabilizing lard which comprises incorporating therein a small amount of 2-tertiary-butyl-4-alkoxyphenol and lecithin.

10. A process for stabilizing lard which comprises incorporating therein a small amount of 2-tertiary-butyl-4-methoxy phenol and lecithin.

11. A process for stabilizing lard which comprises incorporating therein a small amount of 2-tertiary-butyl-4-ethoxyphenol and lecithin.

12. Edible oils and fats normally tending to become rancid having incorporated therewith, in an amount sufficient to retard rancidity development, an inhibitor composition comprising a 2-tert-alkyl-4-alkoxyphenol and lecithin.

13. Edible oils and fats normally tending to become rancid having incorporated therewith, in an amount sufficient to retard rancidity development, an inhibitor composition comprising 2-tertiary-butyl-4-methoxy-phenol and lecithin.

14. Edible oils and fats normally tending to become rancid having incorporated therewith, in an amount sufficient to retard rancidity development, an inhibitor composition comprising 2-tertiary-butyl-4-ethoxy-phenol and lecithin.

15. Lard normally tending to become rancid having incorporated therein, in an amount sufficient to retard rancidity development, an inhibitor composition comprising a 2-tert-alkyl-4-alkoxyphenol and lecithin.

16. Lard normally tending to become rancid having incorporated therein, in an amount sufficient to retard rancidity development, an inhibitor composition comprising 2-tertiary-butyl-4-methoxy-phenol and lecithin.

17. Lard normally tending to become rancid having incorporated therein, in an amount sufficient to retard rancidity development, an inhibitor composition comprising 2-tertiary-butyl-4-ethoxy-phenol and lecithin.

18. Crops subject to oxidative deterioration containing, in an amount sufficient to retard said deterioration, an inhibitor composition comprising a 2-tert-alkyl-4-alkoxy-phenol and lecithin.

19. Alfalfa subject to oxidative deterioration containing in an amount sufficient to retard said deterioration, an inhibitor composition comprising 2-tertiary-butyl-4-methoxy-phenol and lecithin.

20. Alfalfa subject to oxidative deterioration containing, in an amount sufficient to retard said deterioration, an inhibitor composition comprising 2-tertiary-butyl-4-ethoxy-phenol and lecithin.

References Cited in the file of this patent

UNITED STATES PATENTS

| Number | Name | Date |
|---|---|---|
| 2,124,749 | Salzburg | July 26, 1938 |
| 2,226,177 | Orelup | Dec. 24, 1940 |
| 2,310,710 | Rosenwald et al. | Feb. 9, 1943 |
| 2,315,858 | Johnston | Apr. 6, 1943 |
| 2,434,788 | Buxton | Jan. 30, 1948 |
| 2,511,428 | Buxton | June 13, 1950 |